(No Model.) 3 Sheets—Sheet 1.
F. KNOX.
MECHANISM FOR UNITING SCRAPS OF LEATHER OR OTHER MATERIAL.
No. 370,068. Patented Sept. 20, 1887.
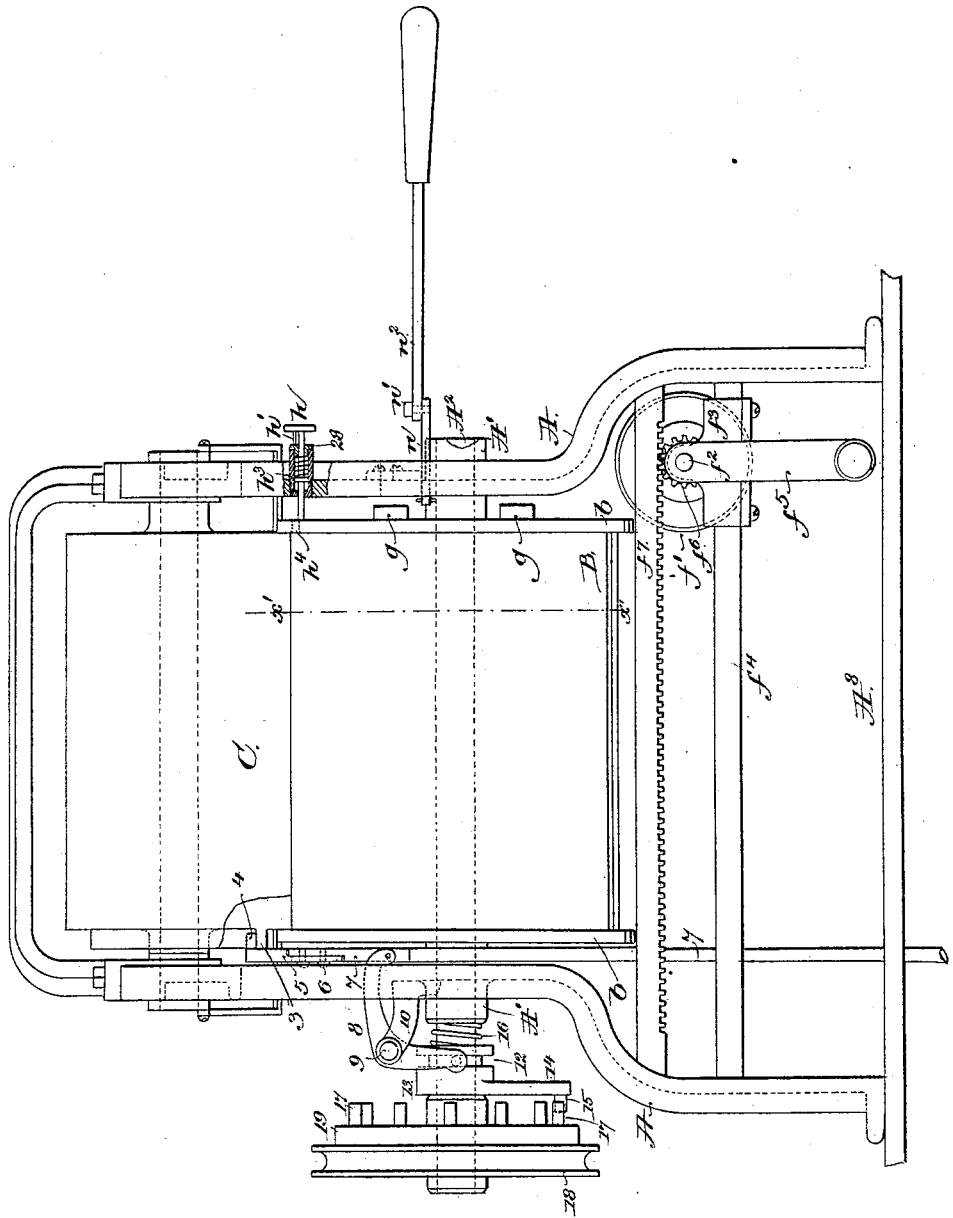

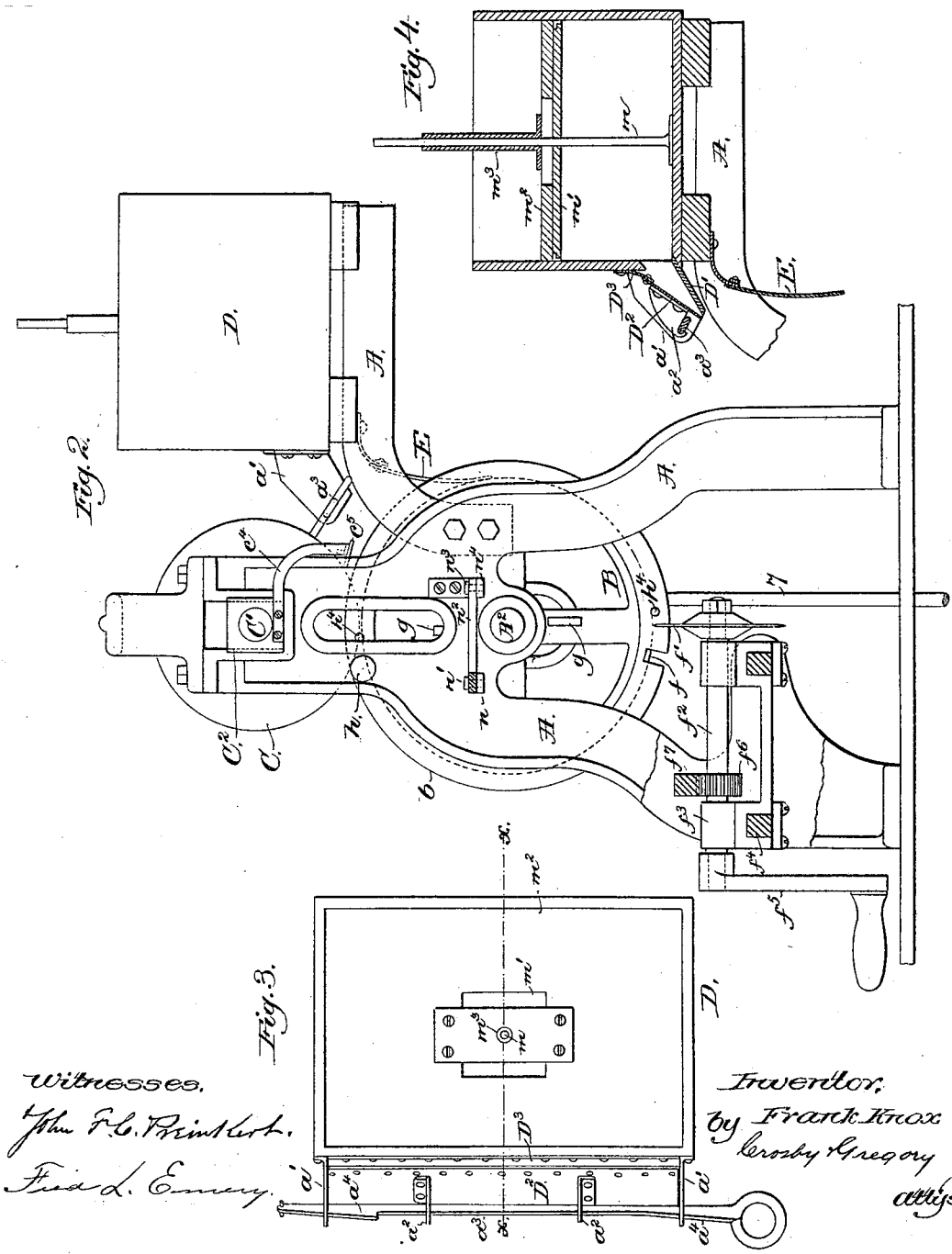

(No Model.) 3 Sheets—Sheet 3.
F. KNOX.
MECHANISM FOR UNITING SCRAPS OF LEATHER OR OTHER MATERIAL.
No. 370,068. Patented Sept. 20, 1887.
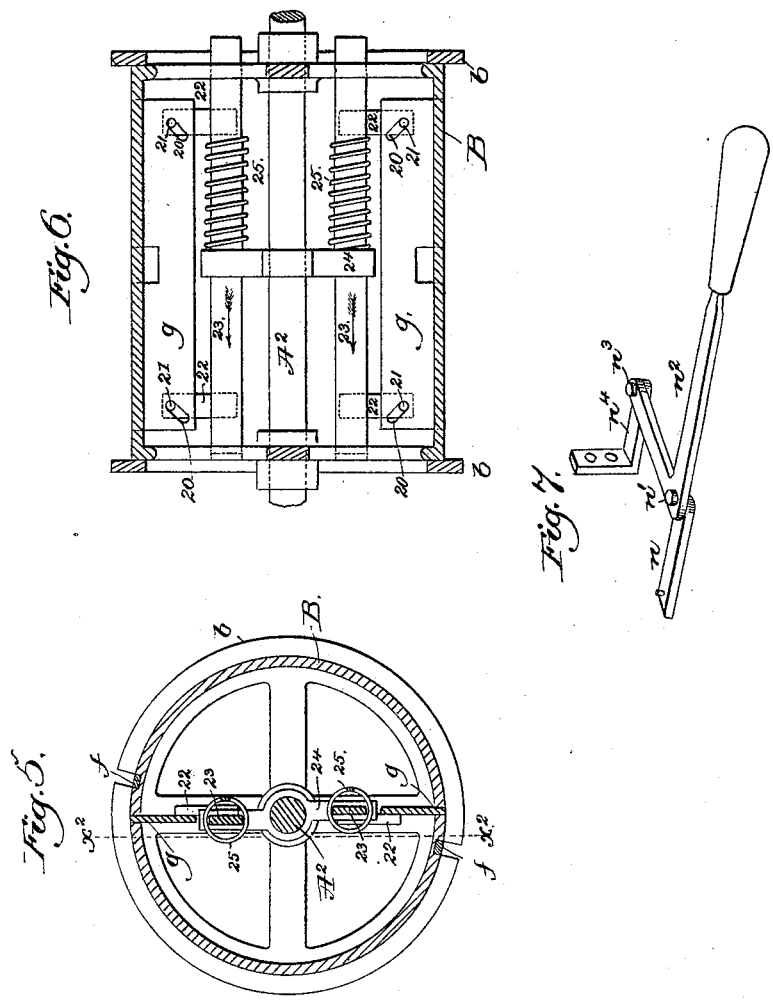
Witnesses.
Inventor:
Frank Knox
by Crosby Gregory
attys.

UNITED STATES PATENT OFFICE.

FRANK KNOX, OF BOSTON, MASSACHUSETTS.

MECHANISM FOR UNITING SCRAPS OF LEATHER OR OTHER MATERIAL.

SPECIFICATION forming part of Letters Patent No. 370,068, dated September 20, 1887.

Application filed April 14, 1887. Serial No. 234,774. (No model.)

*To all whom it may concern:*

Be it known that I, FRANK KNOX, of Boston, county of Suffolk, and State of Massachusetts, have invented an Improvement in Mechanism for Uniting Leather and other Scrap or Material, of which the following description, in connection with the accompanying drawings, is a specification, like letters on the drawings representing like parts.

Leather in its manufacture is subjected, among other things, to shaving or splitting processes, leaving very considerable stock as waste. Some of this class of leather has been taken and strengthened or laid out, and has been placed in molds and with paste and pressure has been formed into what is known as "pancake," which is subsequently cut up into inner soles, heel-lifts, &c., for the manufacture of lower or cheaper grades of boots and shoes, where a better class of sole-leather cannot be used because of its cost.

The object of this invention is to produce a machine by which the pancake leather may be produced more rapidly and of better quality than by packing it in a mold, as has been done.

My invention consists, essentially, in the combination, with a rotating receiving cylinder or bed and a pressure-roller, of pasting mechanism to apply paste to the material being passed between the said cylinder and roller, the material being permitted to wind about or accumulate upon the cylinder until of the proper thickness, when it is cut off. I have provided a cutting mechanism by which to sever the layer of material accumulated upon the cylinder, and a discharging mechanism by which to detach the said material from the cylinder. I have provided the main shaft of the machine with a loose pulley having co-operating with it and the shaft a clutch mechanism which is actuated to let the pulley run loose whenever the material being put on the cylinder has reached the desired thickness, the clutch being operated, as herein shown, by change in position of the pressure-roll with relation to the periphery of the cylinder.

Figure 1, in front elevation, represents a machine embodying my invention; Fig. 2, a right-hand end view of Fig. 1; Fig. 3, a top or plan view of the paste-box; Fig. 4, a section of Fig. 3 in the dotted line $x$. Fig. 5 is a section of the cylinder in the line $x'$, Fig. 1. Fig. 6 is a section of the cylinder in the line $x^2$, Fig. 5; and Fig. 7 is a detail of the hand-lever forming part of the discharging mechanism.

The frame-work A, of suitable shape to sustain the working parts, has suitable bearings, A', to support the main shaft $A^2$, to which is secured the receiving or bed cylinder B, the heads of which are extended beyond the periphery of the cylinder, as at $b$, to form, as it were, a space for the reception of the material to be accumulated upon the cylinder B, the said material being wound upon or about the said cylinder in the said space, it being compacted together by the pressure upon it of the heavy pressure-roller C, the journal C' of which enters boxes $C^2$, free to rise and fall in slots in the frame-work as the material on the cylinder B accumulates in thickness.

The pasting mechanism consists, essentially, of a box or receptacle, D, provided at its side next the cylinder with a delivery, D', having a movable or adjustable side, $D^2$, herein shown as a plate connected to a sheet-metal spring, $D^3$, one edge of which is attached to the box D, the spring acting normally to keep the side $D^2$ away from the lower part of the delivery, so that the paste may flow from the paste-box in proper quantity and fall upon the cylinder, or the leather or other material thereon.

The paste-box has two slotted lugs, $a'\ a'$, and the side $D^2$ two lugs, $a^2\ a^2$, through which is extended a wedge bar or key, $a^3$, having two cams or inclines, as $a^4$, so that longitudinal movement of the said bar closes the side $D^2$, to partially or wholly cut off the delivery of paste or other equivalent material in the box D. The paste dropped from the delivery D' upon the cylinder or the material thereon is smoothed thereon and spread by the wiper E, preferably a stiff piece of leather.

The boxes $C^2$, at opposite ends of the pressure-roll, have each an arm, $c^4$, which serves to carry one end of a doctor, $c^5$, which, rising and falling with the roll, acts uniformly at all times to scrape or clean, and thus prevent the material, leather, or paste from adhering to the pressure-roller, the said doctor being more accurate and serviceable than were it supported independently of the said boxes and pressure-roll.

The paste-box has erected in it a guide-rod, $m$, over which is passed a follower, $m'$, which in practice rests on the surface of the paste in the box D, a pressure-plate, $m^2$, having a guide, $m^3$, attached to it, resting upon the follower $m'$, the guide $m^3$ surrounding the rod $m$.

The roller C is recessed or turned out at its ends to form a ledge, as 3, which is embraced by lugs 4 of a dog, 5, adjustably attached by screws 6 to a bar, 7, extended below the table or bench $A^8$, on which the machine rests, the said bar, near the floor, being in practice attached to a suitable handle in such manner that the bar may be lifted whenever it is desired to raise the roller C. The bar 7 has jointed to it a shipper-lever, 8, having its fulcrum at 9 on a bracket, 10, secured to the frame A, the outer end of the said lever 8 having a pin to enter an annular groove, 12, of the hub 13 of an arm, 14, splined on the shaft $A^2$, and having a pin or projection, 15, to engage, when in the position Fig. 1, one or another of the pins or projections 17 of the loose pulley 18, which in practice receives in its scored part a belt, by which the said pulley is rotated continuously, the plate 19, pins 17, and the arm 14, and its pin or projection forming a clutch. The spring 16 acts normally to press the arm 14 toward the plate 19. As the roller C rises the lever 8 is moved to draw the arm 14 away from the plate 19, and when the desired quantity of material has been accumulated on the cylinder C the arm 14 is drawn to the right far enough to disengage the pins or projections referred to to stop the machine.

The surface of the cylinder will preferably be corrugated or roughened, to better retain the material and prevent its slipping.

The periphery of the cylinder B, as herein shown, is provided with two strips of leather, wood, or other proper material, to form a cutting-bed, $f$, to co-operate with a collar, $f'$, (shown as circular in form,) it being secured to a shaft, $f^2$, mounted in a carriage, $f^3$, free to slide on a track, $f^4$, the said shaft having a handle, $f^5$, by which to turn it, and a pinion, $f^6$, which latter engages the teeth of a rack-bar, $f^7$, rotation of the shaft $f^2$ causing the cutter to rotate and the carriage to travel laterally or parallel to the shaft $A^2$, the cutter at such time (the flanges $b$ being slotted, as shown in Fig. 5) acting to cut the material wound upon the cylinder, so that the said material of proper thickness may be removed to be dried. Near the cutting-beds $f$ the cylinder is slotted for the reception of the plates $g$ of the discharging mechanism, the said plates being slotted, as at 20, to receive pins 21 of arms 22 of slide-bars 23, having bearings 24 secured to the shaft $A^2$, and also in the heads of the cylinder, the said bars 23 being surrounded by springs 25, which normally keep the bars as in Fig. 6, movement of the bars in the direction of the arrows thereon, Fig. 6, forcing the plates $g$ outward to lift up from the cylinder the material independently after the same has been cut, as described. The bars 23 are moved by the pressure against them of the slide or bolt $n$, jointed at $n'$ to an elbow-shaped lever, $n^2$, pivoted at $n^3$ on a lug or ear, $n^4$.

When the cutting mechanism is being operated, the cylinder is held in place by a locking device, herein shown as a spring-pressed pin, $h$, having a head with a projection, $h'$, which, when pulled out, as in Fig. 1, rests on the bushing 28, the latter having, however, at one point a hole to receive the said projection, the pin at such time being free to be moved by the spring $h^3$, so that the end of the pin enters a hole, $h^4$, in the flange $b$.

I claim—

1. In a machine for uniting scrap-leather, a rotating receiving bed or cylinder, a pressure-roller co-operating therewith, and a paste box or receptacle arranged above and adapted to discharge paste upon the receiving-cylinder or material thereon opposite the point at which the bed supports the accumulating material, substantially as described.

2. In a machine for uniting scrap-leather, the rotating bed or cylinder having flanges $b$ projecting beyond its periphery, combined with a pressure-roll mounted in adjustable bearings, and with a paste box or receptacle arranged above and adapted to discharge paste upon the receiving-cylinder or material thereon opposite the point at which the bed supports the accumulating material, to operate substantially as described.

3. The rotating bed or receiving-cylinder having a cutting-bed, combined with a pressure-roll, and with cutting mechanism, substantially as described, to sever the material accumulated upon the bed or receiving-cylinder, substantially as described.

4. The rotating bed or receiving-cylinder and co-operating pressure-roll, and cutting mechanism, substantially as described, to sever the material wound upon the bed or receiving-cylinder, combined with disengaging mechanism to aid in detaching the end of the accumulated material from the bed or receiving-cylinder, substantially as described.

5. In a machine for uniting scrap-leather, a bed or receiving-cylinder having a cutting-bed, a driving-pulley, and a co-operating clutch, combined with the pressure-roll C, a clutch-moving lever, and means between the said lever and pressure-roll whereby the movement of the pressure-roll by the material accumulating upon the bed or receiving-cylinder automatically operates the clutch to stop the machine, substantially as described.

6. The rotating bed or receiving-cylinder and the pressure-roll having its journals in movable boxes, combined with a doctor supported at its opposite ends by the said boxes and rising and falling with the pressure-roll, to operate substantially as described.

7. The rotating receiving bed or cylinder, the co-operating pressure-roll, and a paste box or receptacle having a discharge, the movable plate D², and means, substantially as described, to control the discharge of the paste, as set forth.

In testimony whereof I have signed my name to this specification in the presence of two subscribing witnesses.

FRANK KNOX.

Witnesses:
GEO. W. GREGORY,
B. DEWAR.